(No Model.) 11 Sheets—Sheet 1.

D. EDWARDS.
APPARATUS FOR THE MANUFACTURE OF TIN PLATE.

No. 495,696. Patented Apr. 18, 1893.

Witnesses
B. W. Miller
C. M. Brooke

Inventor
Daniel Edwards,
By his Attorneys
Baldwin Davidson & Wight (No Model.) 11 Sheets—Sheet 2.
D. EDWARDS.
APPARATUS FOR THE MANUFACTURE OF TIN PLATE.
No. 495,696. Patented Apr. 18, 1893.

Fig. 2.

Witnesses
B. W. Miller
C. F. Sensner

Inventor
Daniel Edwards
By his Attorneys
Baldwin Davidson Wight (No Model.) 11 Sheets—Sheet 3.

D. EDWARDS.
APPARATUS FOR THE MANUFACTURE OF TIN PLATE.

No. 495,696. Patented Apr. 18, 1893.

Fig. 3.

Witnesses
B. W. Miller
C. F. Sensner

Inventor
Daniel Edwards
By his Attorneys
Baldwin, Davidson & Wight (No Model.) 11 Sheets—Sheet 4.

D. EDWARDS.
APPARATUS FOR THE MANUFACTURE OF TIN PLATE.

No. 495,696. Patented Apr. 18, 1893.

Witnesses
B. W. Miller.
C. W. Brooke.

Inventor
Daniel Edwards,
By his Attorneys
Baldwin, Davidson & Wight.

(No Model.) 11 Sheets—Sheet 5.
D. EDWARDS.
APPARATUS FOR THE MANUFACTURE OF TIN PLATE.

No. 495,696. Patented Apr. 18, 1893.

Witnesses
B. W. Miller
C. F. Sensner Inventor
Daniel Edwards,
By his Attorneys,
Baldwin, Davidson & Wight (No Model.) 11 Sheets—Sheet 6.

D. EDWARDS.
APPARATUS FOR THE MANUFACTURE OF TIN PLATE.

No. 495,696. Patented Apr. 18, 1893.

Witnesses
B. W. Miller
C. F. Sensner

Inventor
Daniel Edwards,
By his Attorneys
Baldwin Davidson & Wight.

THE NORRIS PETERS CO., PHOTO-LITHO., WASHINGTON, D. C.

(No Model.) 11 Sheets—Sheet 7.
D. EDWARDS.
APPARATUS FOR THE MANUFACTURE OF TIN PLATE.

No. 495,696. Patented Apr. 18, 1893.

Witnesses
B. W. Miller
C. F. Sensner

Inventor
Daniel Edwards,
By his Attorneys,
Baldwin Davidson & Wight (No Model.) 11 Sheets—Sheet 8.
D. EDWARDS.
APPARATUS FOR THE MANUFACTURE OF TIN PLATE.

No. 495,696. Patented Apr. 18, 1893.

Witnesses
B. W. Miller
C. F. Sensner

Inventor
Daniel Edwards,
By his Attorneys
Baldwin Davidson Wight (No Model.)  11 Sheets—Sheet 9.

D. EDWARDS.
APPARATUS FOR THE MANUFACTURE OF TIN PLATE.

No. 495,696. Patented Apr. 18, 1893.

Witnesses
B. W. Miller
C. F. Sensner

Inventor
Daniel Edwards,
By his Attorneys
Baldwin Davidson & Wight (No Model.) 11 Sheets—Sheet 10.
D. EDWARDS.
APPARATUS FOR THE MANUFACTURE OF TIN PLATE.
No. 495,696. Patented Apr. 18, 1893.

United States Patent Office.

DANIEL EDWARDS, OF MORRISTON, ENGLAND.

APPARATUS FOR THE MANUFACTURE OF TIN-PLATE.

SPECIFICATION forming part of Letters Patent No. 495,696, dated April 18, 1893.

Application filed April 12, 1892. Serial No. 428,872. (No model.)

*To all whom it may concern:*

Be it known that I, DANIEL EDWARDS, tin-plate manufacturer, a subject of the Queen of Great Britain, residing at Dyffryn Steel and Tin-Plate Works, Morriston, in the county of Glamorgan, Wales, England, have invented certain new and useful Improvements in Apparatus Used in the Manufacture of Tin, Terne, and other Coated Metal Plates, of which the following is a specification.

The object of this invention is to provide mechanical appliances by which tin terne or other coated metal plates as they rise up from the oil or flux bath at the exit of the coating bath may be automatically taken and delivered into a traveling rack to cool, previous to being taken away by girls to be cleaned or branned. To effect this I cause the upper edge of each plate, as the plate rises up from the delivery rolls in the oil or flux bath to rise up between the jaws of a clip. At this time the jaws of the clip are held open. The clip is carried at one end of an arm which at the time when a plate is entering into it is in approximately a horizontal position. Through the opposite end of the arm passes an axis which is parallel with the rolls and is driven continuously. As the upper edge of the plate rises up into the clip it is made to come against the under side of the end of a lever which moves a latch and other parts carried by the arm. The latch is thereby caused to engage with teeth or notches formed around the circumference of a wheel which is fast on the continuously traveling axis above mentioned. The arm is so made fast with the axis and is at once carried upward by its rotation. Immediately after the arm is so made to commence to travel upward, the clip is allowed to grip the plate and carry it along with it. As the axis revolves and when the clip arm and plate have been carried over to its opposite side of the axis, the end of the plate held by the clip enters a rack, and a finger on the clip arm coming against a stop causes the clip to open and release the plate. The clip arm after releasing the plate passes on, is still carried round with the continuously rotating axis, the latch being kept engaged with the wheel by a fixed guide ring which closely encircles it. There is however a notch in the ring which at a suitable point allows the latch to escape and then the arm comes to rest and waits until the latch is again put into gear. I provide two or more clip arms to follow each other in succession around the axis and immediately one has received a plate from the rolls another advances to the receiving position. The arm standing in the receiving position prevents a filling piece from occupying that notch in the guide ring which arrests the following arm. Similarly this second arm (if three arms be employed) controls the filling piece for another notch in rear. The notches serve as stopping stations from the clip arms but only so long as they are unoccupied by filling pieces. The receiving rack consists of a series of plate carriers with pins upon them. These carriers are connected by an endless chain and they are supported by rollers which run along a guide course. When a plate has been delivered into one compartment of the rack the chain is made to travel a distance to bring the next compartment of the rack into position to receive a plate. To give this motion to the endless chain at the proper time a pin standing out from the side of the clip arm comes against a lever and puts a rack in gear with a constantly revolving pinion. The toothed rack when thus moved advances the series of carriers. When the toothed rack gets to the end of its course it drops out of gear and a spring causes it to return. The plates placed into the compartments of the endless traveling rack may be automatically discharged from them at any desired point, if they have not been previously taken from them by hand. To do this each carrier is hinged to the chain and it falls outward at a place where it is no longer supported by a guide.

In order that my said invention may be fully understood and readily carried into effect I will proceed to describe the drawings hereunto annexed.

Fig. 3ª shows some of the parts which appear in Fig. 3, from the other side of the machine, and they are here drawn to a larger scale.

Figures 1, 14:
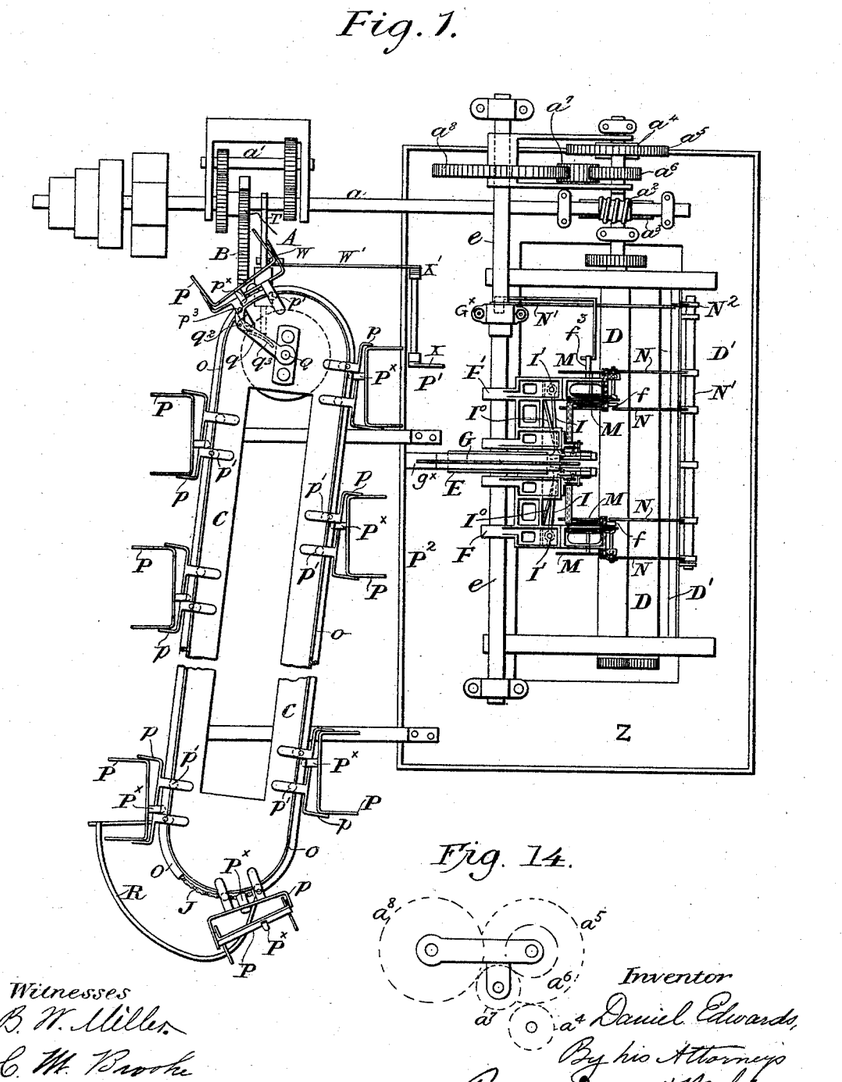
Figure 1 is a plan drawn to a smaller scale than any of the other figures. It shows the principal parts of the apparatus.
Fig. 14 shows an elevation of a portion of the gearing.

Referring more especially to Fig. 1, $a$ is a shaft continuously driven by an endless belt or otherwise. It gives motion in the manner shown to a counter-shaft $a'$, which drives the pinion A on a sleeve which revolves freely on the shaft $a$. B is the toothed rack which imparts movement to the endless chain of plate carriers. C is the guide course for the plate carriers. $a^2$ is a worm on the axis $a$. It drives a worm wheel $a^3$ on the axis of one of the withdrawing rolls D. These rolls are geared together. D' are other guide rolls beneath the rolls D. The shaft $a$ also drives the shaft $e$ on which is the toothed or notched wheel E and this serves to impart movement to the clip arms. The driving train from $a$ to $e$ consists of the worm $a^2$ and wheel $a^3$, a wheel $a^4$ on the same axis with the latter driving a wheel $a^5$. The wheel $a^5$ is fast with the wheel $a^6$ which drives $a^7$ and $a^8$ the latter fast upon the shaft $e$.

Figure 2:
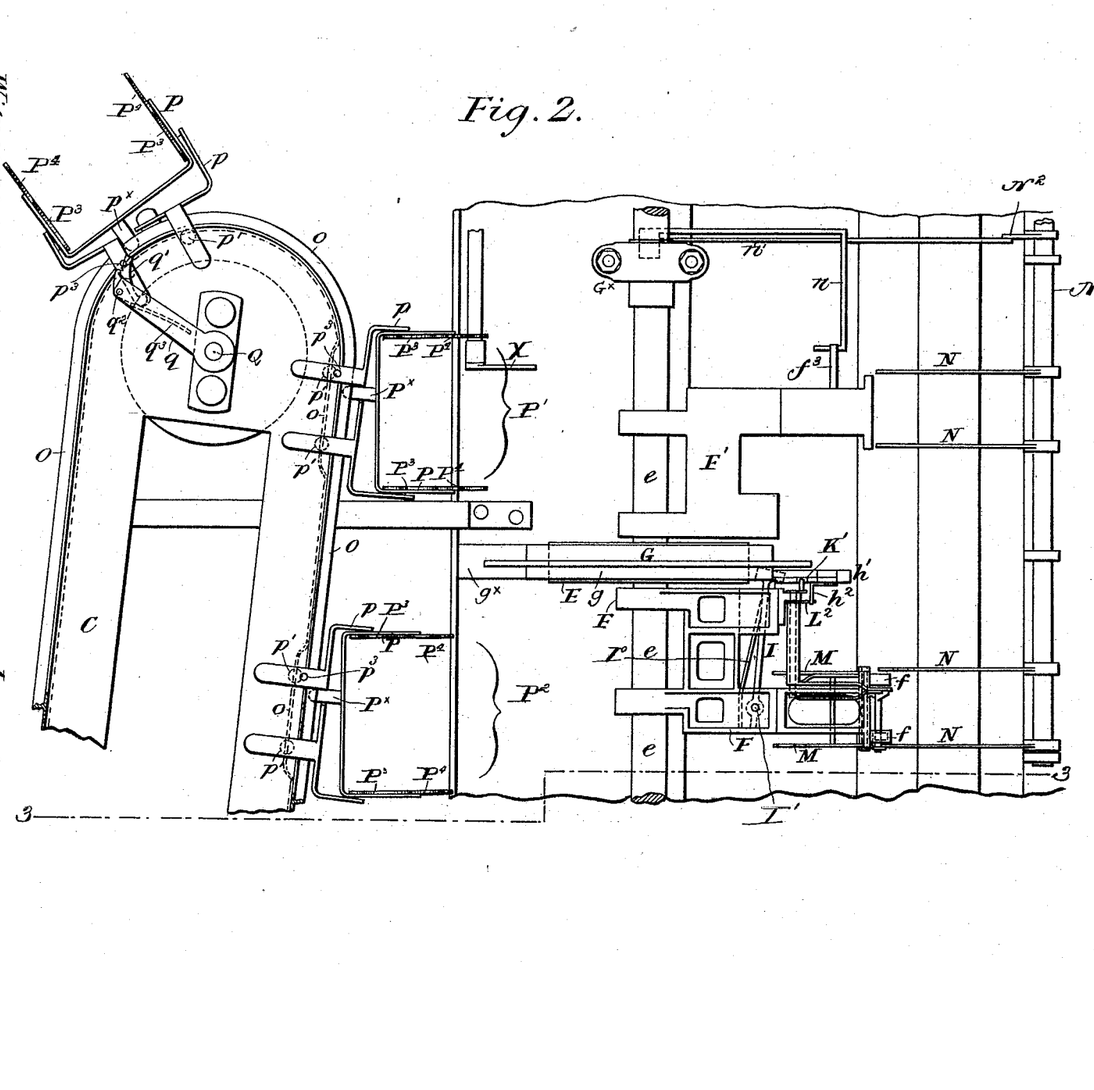
Fig. 2 is a plan in which one of the clip arms is shown complete together with the parts working in connection therewith and also one end of the traveling receiving rack.
Figure 3:
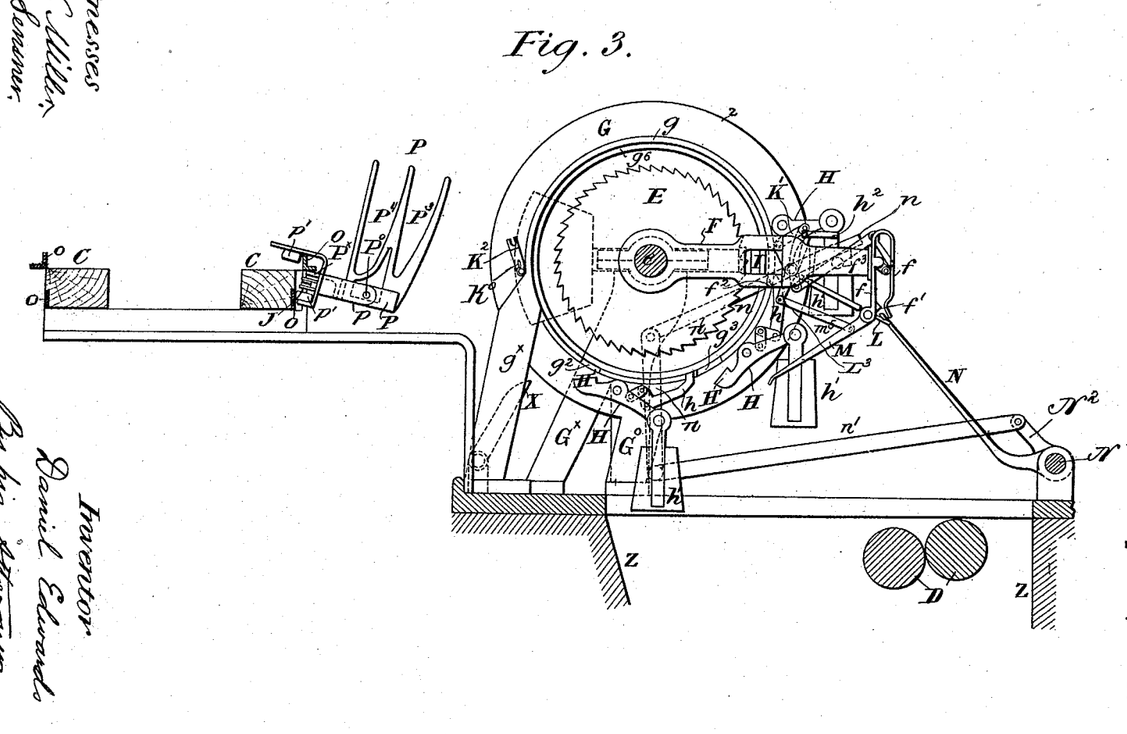
Fig. 3 is a sectional elevation of the parts shown in Fig. 2. The section is taken on the line 3—3 of Fig. 2.
Figure 3A:
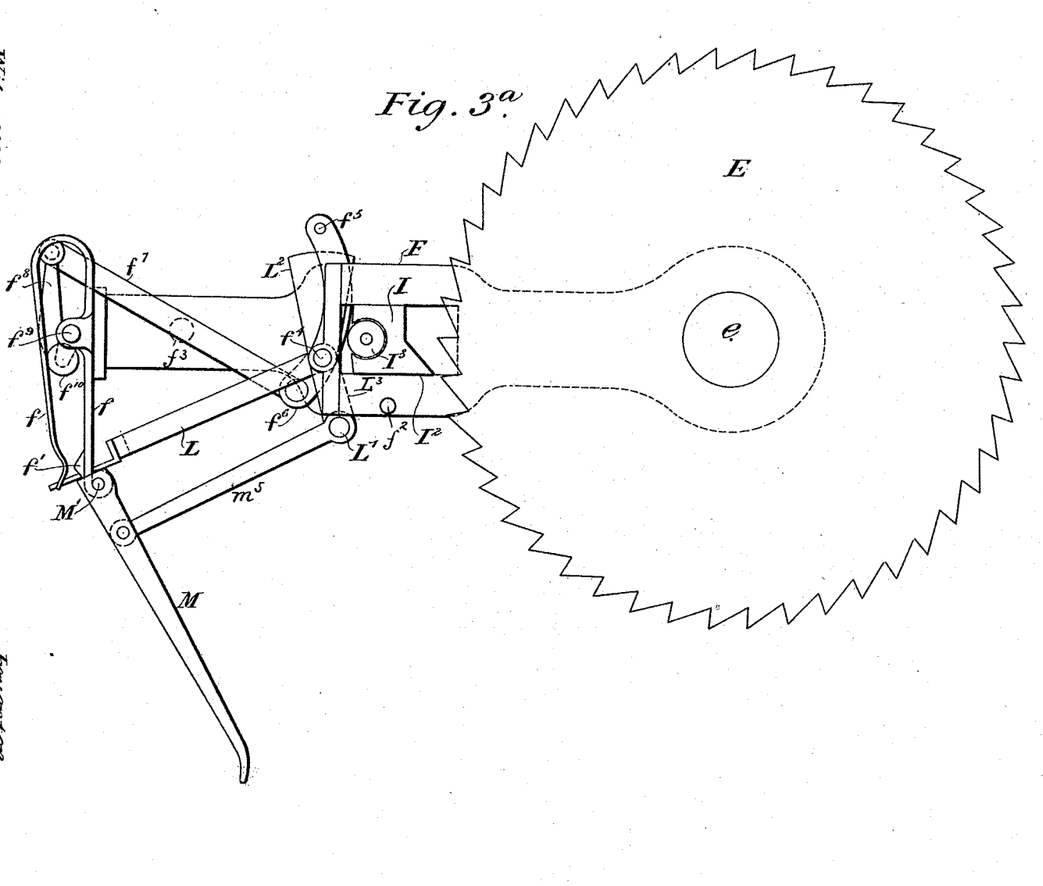

In Figs. 2 and 3, the shaft $e$ and the wheel E are again seen. F is a clip arm complete with all the working parts. The pot Z here shown is a wide one and requires to be provided with two sets of clip arms working side by side. F' is one of the clip arms of the second series. It is shown stripped of its working parts. Provision is made for three clip arms in each series or six arms in all; they all work similarly and in the following description, attention is directed for the most part to one only of the arms. $f f$ are the clips on the clip arms. Their elasticity causes them to nip and hold the plate when they are permitted to do so. Conical studs $f'$ form the nipping parts on one side. G is the fixed guide ring, supported by a frame or arms $g^\times$ G⁰. The ring G has notches in it at $g'$, $g^2$ and $g^3$. Opposite to the notches are levers H. with filling pieces H'. at their ends fitting the notches in the guide ring and when in place making the circular course complete. The levers H are mounted upon a flange $z$ secured to a flange $g^6$ of the ring G. I is the latch. It has a spring I⁰, and is jointed at I' to the clip arm. The ring G holds it in gear with the wheel E until it drops out when it comes to an unoccupied notch in the ring. $f^2$ is a pin on the clip arm which when the arm is in the position shown serves to hold the next filling piece out of the notch $g^3$. The pin $f^2$ operates upon levers $h$ which are linked to the levers H. When the levers H are free, the weights $h'$ suspended from them insert the filling pieces into the notches. For the uppermost lever H, no lever $h$ is required. K' K² are fingers jointed to the flange of the ring G. A light spring K⁰ holds the finger K² in the position shown. These fingers open the clips, operating in conjunction with the gear shown by Figs. 6 and 7. L is the trigger lever. It operates in conjunction with apparatus more clearly shown in Figs. 8 and 9 to start the clip arm when a plate rises from the rolls D. M are guiding prongs which serve both to guide the plate into the clip and to support it as it is being carried to the receiving rack. N are other guiding prongs which aid in leading the plate into the clip and then pass rapidly away to allow the plate to pass. $f^2$ is another pin on the clip arm which in passing acts upon a lever $n$ and so gives motion to the guiding prongs N. The guiding prongs are all fixed on one shaft N' and the lever $n$ is connected with an arm N² on the shaft by a link $n'$. The pin $f^3$ serves also another purpose; it comes against the arm X (Fig. 8) and by moving it puts the parts of the receiving rack into movement. C is the guide course for the sections of the receiving rack. P P are plate holders to receive the plates from the clip arms between their projecting pins or prongs P³ P⁴. Each plate holder receives in succession two plates, first a plate between the inner prongs when it is in the position marked P' in Fig. 2 and then a plate between the outer prongs when it is in a position marked P². $p$ are frames to which the plate holders P are pivoted; they are also supported by projecting lugs P× resting beneath the upper guide rail $o$. Upon the frames $p$ there are also rollers $p'$ $p'$ to run upon the guide rails $o$. In the positions P' P² the lower guide rail deviates from its direct course and allows the plate holders to tilt forward somewhat toward the clip arms but elsewhere the lower guide rail $o$ is immediately beneath the upper guide rail and the plate holders stand upright. J is an endless chain which carries the frames $p$. On each frame $p$ is a pin $p^3$ and by this it is propelled. The pin is caught by a catch $q'$ on an arm $q$ fixed upon an axis Q. The arm $q$ makes a partial rotation to and fro. $q^2$ is the pivot of the latch, and $q^3$ is a spring pressing upon its tail and causing it to engage with the pin $p^3$, during the forward movement of the arm $q$, but allowing the latch to pass the pin during the return movement.

Figure 4:
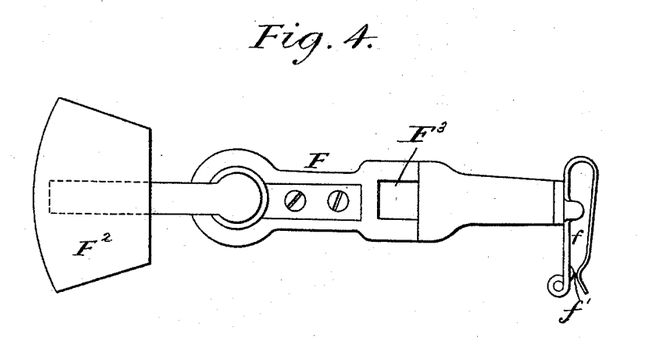
Fig. 4 is a side elevation of one of the clip arms.

In Fig. 4 the clip arm is seen with its counterpoise $F^2$. Each clip arm is provided with such a counterpoise. $F^3$ is the opening to receive the latch I.

Figure 5:
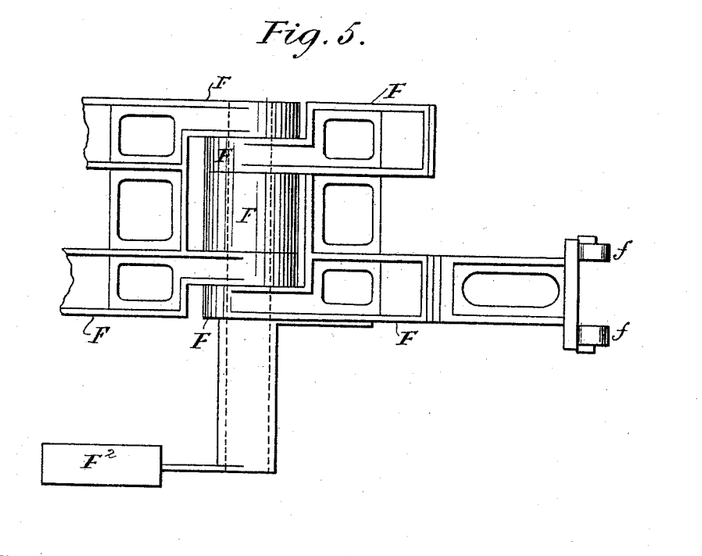
Fig. 5 is a plan of this arm, together with parts of two other arms which together form a set carrying clips which follow the same course around the axis.

Fig. 5 shows especially how the three clip arms forming a set are carried upon the axis.

Figure 6:
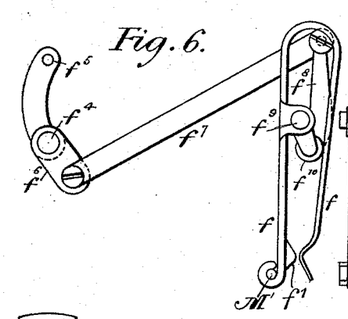
Fig. 6 is a side elevation of the clips and opening gear.
Figure 7:
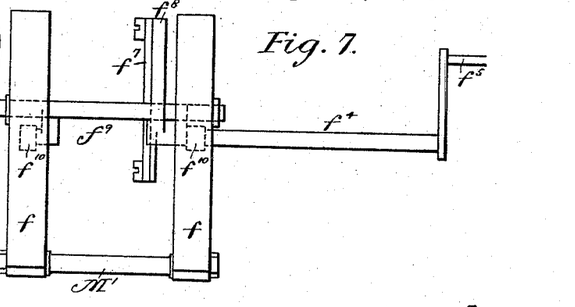
Fig. 7 is a front elevation of the same.

In Figs. 6 and 7 $f^4$ is a shaft mounted upon the clip arm. It carries a pin $f^5$ and has an arm $f^6$ which by a link $f^7$ is connected to a lever $f^8$. The lever $f^8$ is on a shaft $f^9$ carried by the spring clips $f$ and the same shaft by means of short arms carries rollers $f^{10}$. These rollers bear upon the jaws of the clip and press them outward when the pin $f^5$ is moved outward or from left to right as seen in Fig. 6. As the clip arm travels round from the position in which it is shown in Fig. 3, the pin $f^5$ enters the notch in the end of the finger $K^2$. The finger permits the clip arm to travel on without check, but the finger turns about its own axis, the pin $f^5$ carrying it forward with it. It results that the pin $f^5$ in passing is momentarily thrust outward away from the axis $e$, and this movement imparted to the pin opens the jaws. The action is repeated when the arm reaches the finger $K'$ but in this case the arm is stopped before the pin $f^5$ has got clear of the finger $K'$ and consequently the jaws of the clip stand open until the clip arm next moves forward.

Figure 8:
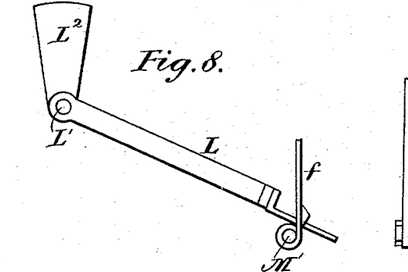
Fig. 8 is a side elevation and Fig. 9 is a front elevation of the trigger lever and parts connected therewith.
Figure 9:
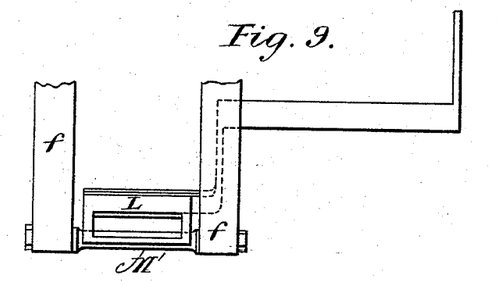
Figure 10:
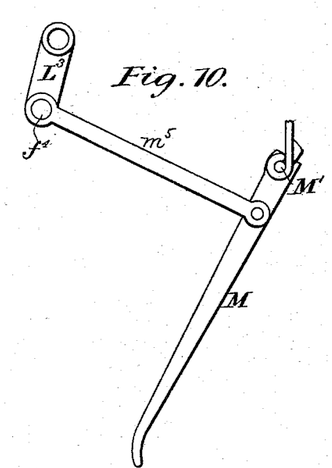
Fig. 10 is a side elevation and Fig. 11 is a front elevation of guiding and supporting prongs jointed to the clip.
Figure 11:
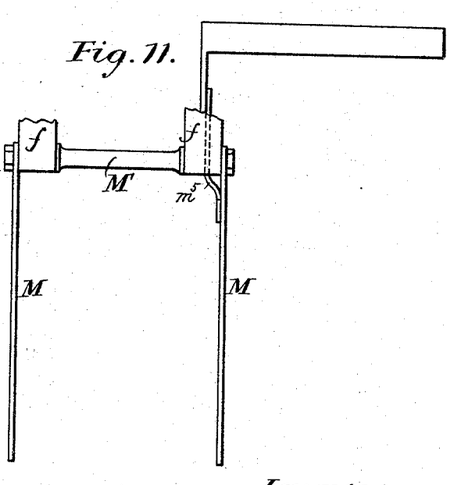
Figure 12:
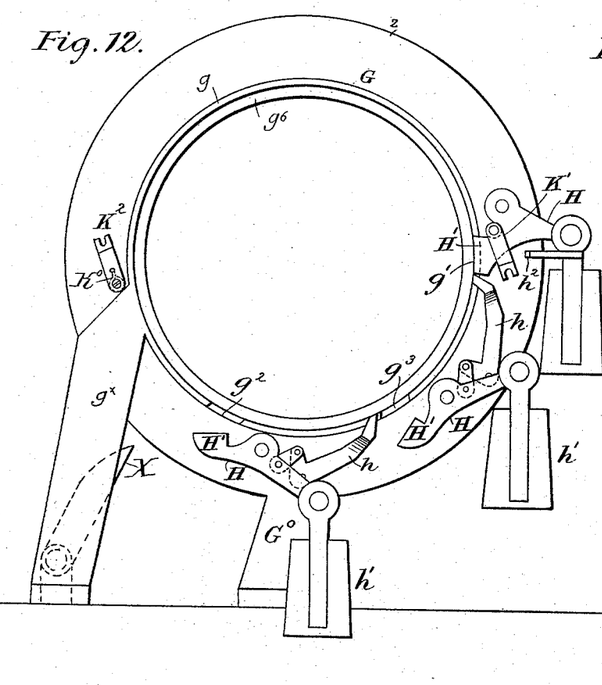
Fig. 12 is a side elevation of the guide ring which controls the latches, and the filling pieces entering notches in the same with other parts.
Figure 13:
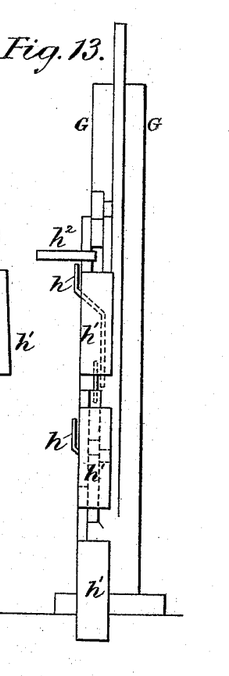
Fig. 13 is a front elevation of the parts shown in Fig. 12.

In Figs. 8 and 9 L' is the shaft of the trigger lever L. It is carried by the clip arm and is hollow, the axis $f^4$ passing through it. The shaft L' carries a quadrant $L^2$ and when the clip arm comes nearly up to the position shown in Fig. 3 this quadrant strikes against the arm $h^2$ of the uppermost weight $h'$ and lifts the weight. When the plate coming up from the rolls D moves the trigger lever L the arm $h^2$ escapes from the quadrant and the weight falls. In Figs. 10 and 11 the shaft L' also appears together with another arm $L^3$ upon it. This is connected by a link with the guide prongs M which are on a shaft M' carried by the spring clips $f$. Figs. 12 and 13 do not require further description.

Figure 15:
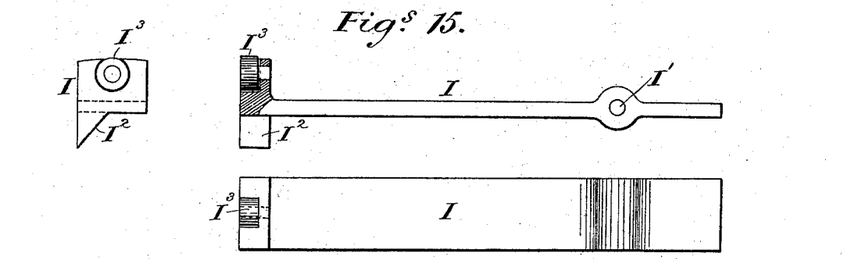
Figs. 15 show one of the latches.

In Fig. 15 I' is the center at which the latch is connected with the clip arm. $I^2$ is the tooth which engages with the teeth of the wheel E, and $I^3$ is a small friction roller on the latch on which the filling pieces H' on the levers H press to put the latch into gear, and which when it is in gear runs on the guide ring G.

Figure 16:
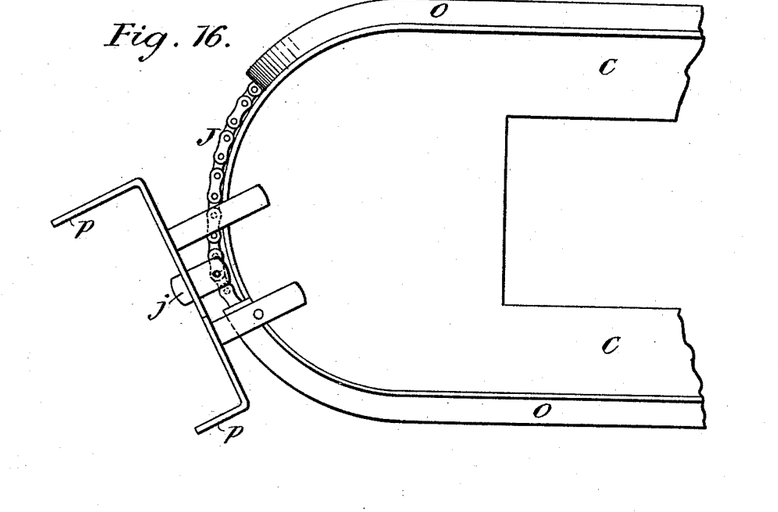
Fig. 16 is a plan of a portion of the guide course for the traveling receiving rack. A part of one of the plate carriers and of the chain connecting the carriers is also shown.
Figure 17:
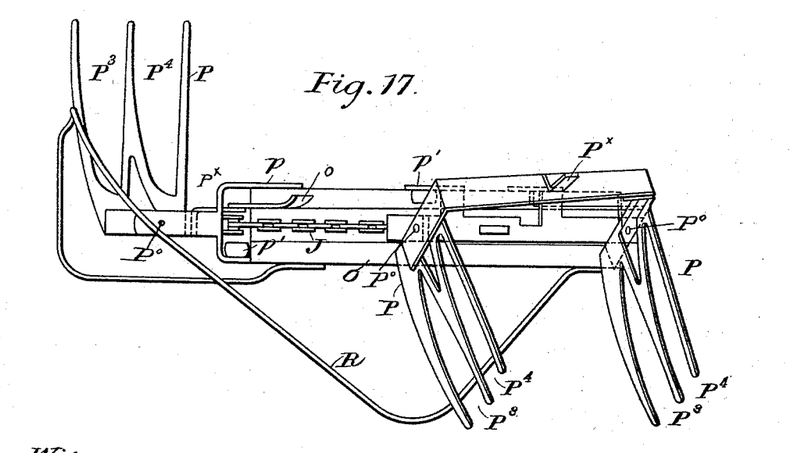
Fig. 17 is an end elevation of the guide course and shows two plate carriers, one of them being tipped to deliver the plates.
Figure 18:
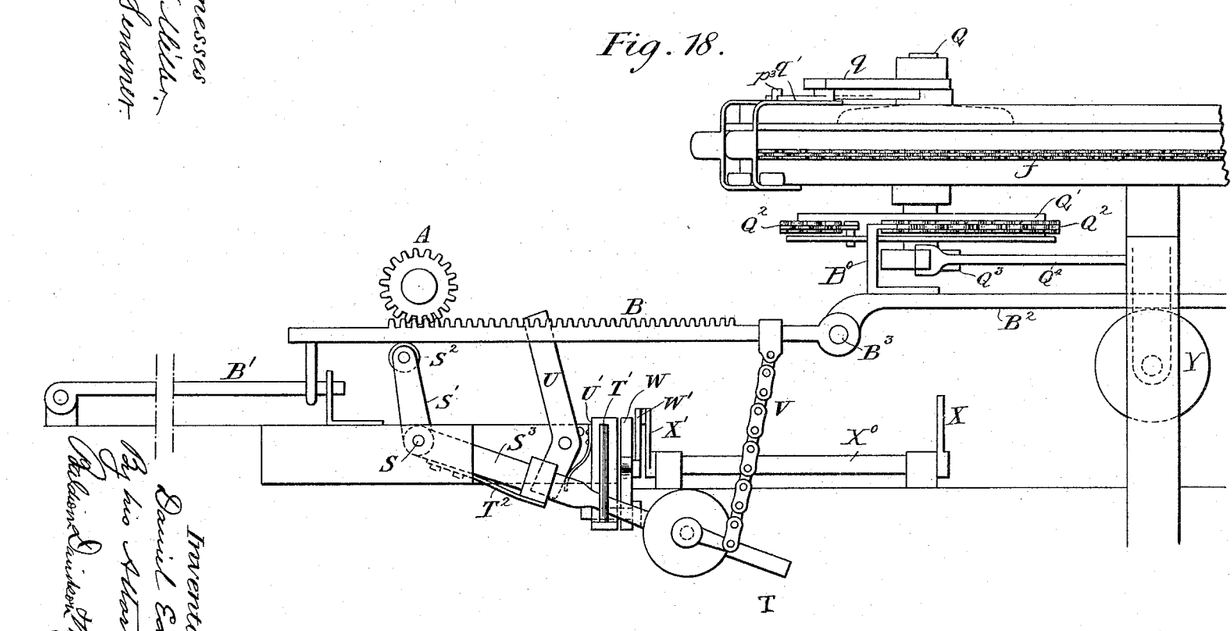
Fig. 18 is a side elevation of part of the guide course together with the gearing for imparting intermittent motion to the endless series of plate carriers. The parts are here shown in the positions they occupy at the commencement of a movement.
Figure 19:
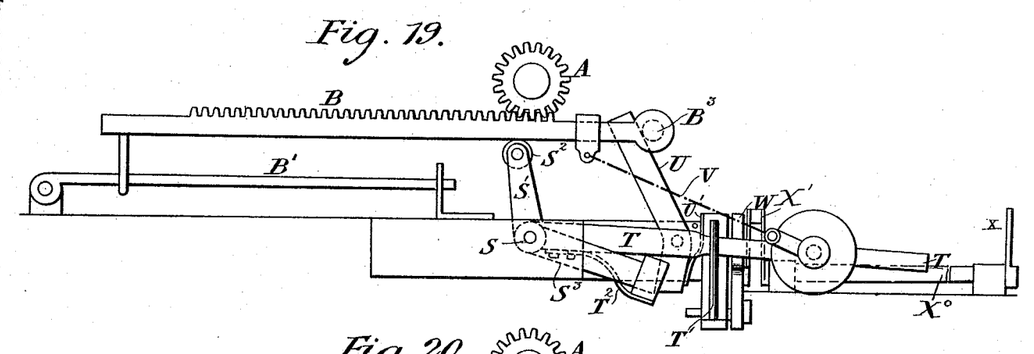
Fig. 19 shows some of the parts in the positions they occupy at the end of a movement of the traveling receiving rack.
Figure 20:
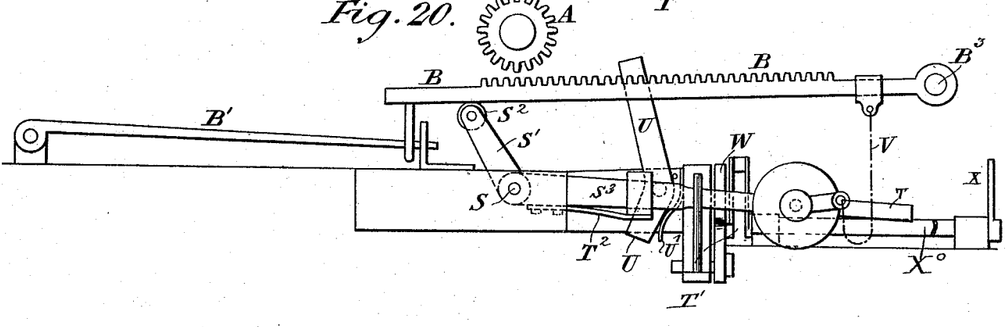
Fig. 20 shows the parts represented in the preceding figure in the position of rest.
Figure 21:
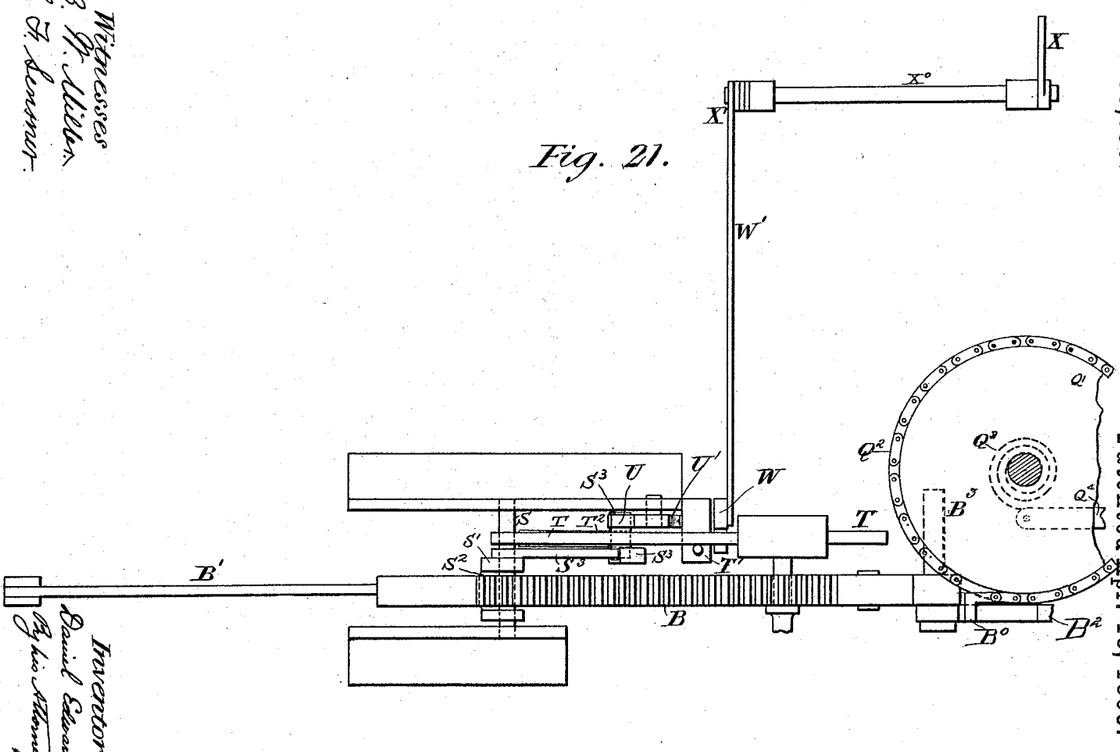
Fig. 21 is a plan showing some of the parts represented in Figs. 18, 19 and 20.

In Fig. 16 the connection of the endless chain J with the frames $p$ of the plate carriers is seen. A tongue $j$ attached to the chain by one of the joint pins projects through a hole in the frame $p$, and it may receive a split pin beyond. Each frame is connected with the chain in this manner. The flange of the upper guide rail $o$ is partly cut away. This is to allow the plate carrier to tip about the pivot $P^0$ in the manner seen in Fig. 17, the tongue $P^\times$ escaping when it comes to the gap in the supporting flange. R is a guide rail which as the plate carrier travels on after the plates have fallen out into a receiver raises it again to its erect position. Generally however the plates will be removed by hand before the plate carrier tips.

In Figs. 18, 19, 20 and 21 the pinion A and the toothed rack B are again seen; so are also in the first mentioned figure the shaft Q and arm $q$ and some other of the parts previously described. Q' is a drum on the axis Q and $Q^2$ is a chain lapped around the drum and attached to the rack B. $Q^3$ is a spring coiled around the axis Q, attached to it at one end and at the other to a fixture $Q^4$. B' $B^2$ are guides which carry the rack and permit of longitudinal movement. The guide $B^2$ is supported upon a roller Y. It has a fixture $B^0$ upon it, and to this, one end of the chain $Q^2$ is attached. S is an axis with a lever arm S' and friction pulley $S^2$. When erect as in Figs. 18 and 19 it holds the rack B in gear with the pinion A but when inclined as in Fig. 20 it allows the rack to fall out of gear. $S^3$ is another arm on the axis S. T is a weighted lever loose upon the axis S. T' is a guide for this lever. $T^2$ is a spring fixed to the lever T and pressing on the under side of the arm $S^3$. U is a catch lever. It is provided with a spring U' and it serves to retain the arm $S^3$ in a position such that the other arm $S^2$ on the axis S holds the rack B in gear. $B^3$ is a pin on the rack B which at the end of the movement trips the catch lever U. V is a chain by which the rack B lifts the weighted lever T. W is a latch which supports the lever T when raised. The latch is connected by a link W' with an arm X' which is upon the same shaft $X^0$ with the arm X. A spring not shown presses the latch W forward.

The action of the machine is as follows:— The plate rising from the rolls D enters between the jaws of the spring clip $f$ and as it does so it moves the trigger lever L. The movement of the trigger lever is shared by the quadrant $L^2$ on the same axis with the lever and the arm $h^2$ escapes from off the quadrant allowing the weight $h'$ to fall. The lever H is thus turned sufficiently about its pivot to thrust the filling piece H' upon it into the hole $g'$ in the guide ring G, previously occupied by the head of the latch I. The latch is thus thrust inward and the tooth $I^2$ upon it enters between the teeth of the constantly revolving wheel E. The clip arm F consequently moves forward and the latch is kept in gear with the wheel by the guide ring G. Immediately the clip arm commences to move the pin $f^5$ escapes from the finger K' and the spring clips are free to close and they take hold of the plate. Springs may obviously be substituted for the weights $h'$. The movement of the clip arm around the axis brings the pin $f^5$ down upon top of the finger $K^2$. The finger is pressed outward away from the center and so a movement is given to the lever $f^8$ such as to cause the opening of the spring clip and the plate is released by it and left between the pins of the plate holder P. The clip arm travels on without pause and as soon as the finger $K^2$ has been passed the clip again closes. Presently the head of the latch I reaches the opening $g^2$ in the guide ring which it enters thereby disengaging the clip arm from the wheel E and bringing it to rest. The opening $g^2$ may however be occupied by a filling piece H' on the weighted lever H and if this be the case the clip arm will pass on without stopping until farther on at $g^3$ it finds an unoccupied opening in the guide ring. Each of the clip arms carries a pin $f^2$ and when the arm stands at the receiving position, this pin acting on the levers $h$ and H holds up the weight $h'$ and the corresponding opening in the guide ring will then be vacant to receive the latch of another arm coming round. Similarly if a clip arm is at rest with its latch occupying the opening $g^3$ the pin $f^2$ upon it will hold up the next weight $h'$ and the opening $g^2$ will be vacant and ready to receive the latch of the arm which next comes round. When the clip arm at the receiving point is set in motion by the rise of a plate into the clip, the weight $h'$ next below is set free and it immediately operates to close the opening in the guide ring at $g^3$ displacing the latch of the clip arm previously detained at this opening. This clip arm then advances to the receiving point and as it does so the quadrant $L^2$ which it carries comes against the arm $h^2$ on the upper weight $h'$; this latter is lifted and the arm comes to rest. Before this takes place however the pin $f^5$ has come against the finger K'. The finger in turning pushes back the pin and the clip is opened. The plates are guided from the rolls D into the clip by the two sets of fingers M and N. The fingers M come forward when the trigger lever is moved by the plate and the plate rests upon them as the clip arm carries it over the axis to the receiving rack. The fingers N when the clip arm is in the receiving position are held in place to guide the plate by the pin $f^3$ on the clip arm. When the clip arm starts from the receiving position the fingers N are moved rapidly out of the way, but are replaced by the next clip arm as it comes round. The plates when released by the clip arms are left between the pins of the plate holders P and the holders immediately travel on a distance. This is brought about by the movement to and fro of the lever arm X. Immediately after the clip arm releases the plate the pin $f^3$ upon the arm strikes the arm X on the same axis with which there is the other arm X' connected with the catch W. At this moment the catch is supporting the weighted lever T and this lever is resting on the arm $S^5$ which is on the same axis with the arm S'. This latter arm supports the rack B. The fall of the weight thus brought about raises the rack B into gear with the constantly revolving pinion A and the rack passes from the position of Fig. 20 to that of Fig. 18. The lever arm $S^3$ when thus carried down by the weighted lever T, is retained by the catch lever U, which is thrown forward by its spring U', and the lever arm $S^3$ cannot rise again until the lower end of the catch lever is moved out of its way. The rack B, when thrown into gear, travels from right to left, and by the mechanism already described it moves the plate carriers forward. Also as the rack B moves toward the left it lifts the weighted lever T by means of chain V until it is again caught and retained by the latch W. At the same time the spring $T^2$ is constrained. Finally the pin $B^3$ comes against the catch lever U and moves it until the lever arm $S^3$ escapes and the spring $T^2$ then at once throws it and the lever arm S' into the position they occupy in Fig. 20. The rack B then drops out of gear. The guide B' is arranged as shown to admit of this. The spring $Q^3$ then brings the rack back to the starting point.

Sometimes in order to obviate risk of breakage in place of mounting the guide ring G on legs which prevent all movement I mount it so that it can turn around the axis $e$ although ordinarily it remains at rest. A convenient arrangement is to arrange the guide ring G with an inwardly projecting flange to occupy a groove in the wheel E. This groove surrounds the wheel and the teeth extending on either side. A long link is jointed to the periphery of the guide ring on the delivery side and this extends up to one arm of an overhead lever. A rod descends from the other arm of this lever to the frame shown in Fig. 14 in which are the gear wheels $a^5$ $a^6$ $a^7$. The weight of these wheels under ordinary circumstances prevents movement of the guide ring G around the axis $e$; but if a latch should fail to disengage at the proper time the guide ring will yield and prevent breakage. As the gear frame and wheels $a^5$ $a^6$ $a^7$ are at the same time lifted, the mechanism necessarily comes to rest.

What I claim is—

1. In an apparatus for receiving plates as they rise from a pot, the combination of an arm, a plate clip carried thereby, a rotating shaft, means for connecting the clip arm with the shaft to cause it to rotate therewith, and mechanism operated by the plate to actuate the devices which connect and disconnect the clip arm with and from the rotating shaft.

2. The combination of a rotating shaft, an arm mounted thereon, a clip carried by said arm, a latch for connecting the clip carrying arm with the rotating shaft to cause it to rotate therewith, and a trigger lever operated by the plate and engaging with the latch to cause it to engage with the rotary shaft.

3. In an apparatus for receiving plates as they rise from a pot, the combination of a plate-holder, a rotary shaft, devices for connecting the plate-holder with the rotary shaft, and a trigger lever operated by the plate for controlling the action of the latch.

4. The combination of a plate-holder, a continuously moving support for the plate-holder, means for connecting and disconnecting the plate-holder with and from its continuously moving support to cause it to rotate therewith or to remain stationary while its support moves, and devices for controlling the mechanism which locks the plate-holder with its support.

5. In an apparatus for receiving plates as they rise from a pot, the combination of an arm, means for moving it from one position to another, a clip carried by the arm, a finger, devices for connecting it with the clip to hold the clip open when receiving the plate, devices for causing the clip to close after having received the plate, and another finger for again opening the clip as the arm passes the point where the plate is delivered.

6. In an apparatus for receiving plates as they rise from a pot, the combination of two or more arms, clips carried thereby, a rotary shaft on which the arms are mounted, latches or clutches for connecting and disconnecting the clip arms with and from the shaft, trigger levers operated by the plates for causing the latches or clutches to engage, a guide for retaining the latch or clutch while each arm travels from the receiving point past the delivery point, and which also allows it to escape in order that the arm may come to rest, and mechanism operated by another clip arm in its forward movement for again causing the latch or clutch to engage, and the arm to advance to or toward the receiving point.

7. In an apparatus for receiving plates as they rise from a pot, the combination of an arm, a clip carried thereby, a rotary shaft on which the clip arm is mounted, a latch or clutch for connecting and disconnecting the arm and shaft, a trigger lever operated by the plate for causing the latch or clutch to engage, and a guide for holding the latch or clutch engaged while the arm carries forward and delivers the plate, and which then allows the latch or clutch to escape and the arm to come to rest.

8. In an apparatus for receiving plates as they rise from a pot, the combination of a clip arm, a horizontal shaft on which it is mounted, means for causing the clip arm to revolve intermittently with the shaft, an endless traveling rack on to which the plates are delivered after they are carried up and over the shaft, and which conveys the plates away, and means for actuating the endless traveling rack step by step, as the plates are delivered.

9. In an apparatus for receiving plates as they rise from a pot, the combination of a clip arm, means for moving the clip arm forward, a trigger lever actuated by the rising plate and operating upon the clip arm to cause it to hold and carry the plate forward and deposit it, and a rack in which the plate is deposited.

DANL. EDWARDS.

Witnesses:
   W. STOBO ANDREW,
   A. HELY,
*Clerks to Messrs. Beor & Plant, Solicitors, Swansea.*